I. M. GRIFFIN.
Subsoil-Plow.

No. 8,342. Reissued July 23, 1878.

Witnesses:
J. Barritt
Ch. Riegelmann

Inventor:
I. M. Griffin.
Per: Richard Gerner
Atty.

N. PETERS, PHOTO-LITHOGRAPHER, WASHINGTON, D. C.

UNITED STATES PATENT OFFICE.

IRA M. GRIFFIN, OF MARYVILLE, MISSOURI.

IMPROVEMENT IN SUBSOIL-PLOWS.

Specification forming part of Letters Patent No. 155,438, dated September 29, 1874; Reissue No. 8,342, dated July 23, 1878; application filed July 3, 1878.

*To all whom it may concern:*

Figure 1:
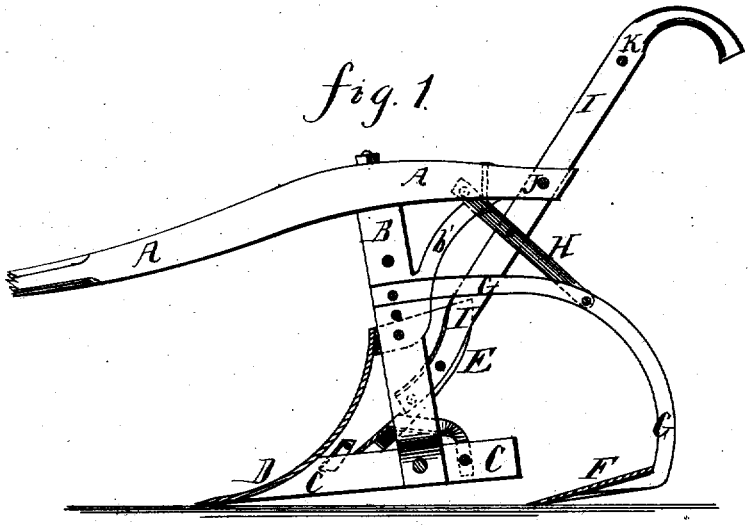
Figure 2:
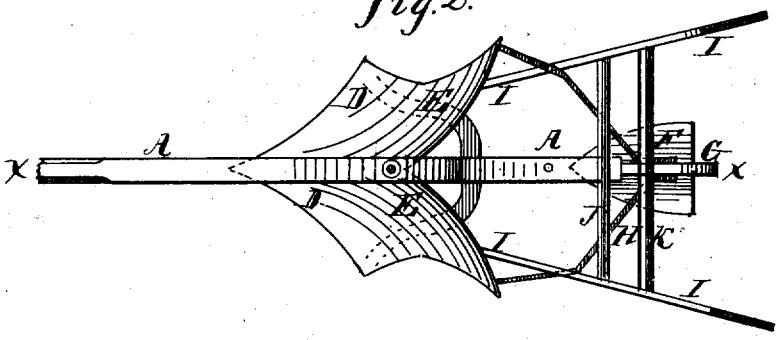

Be it known that I, IRA M. GRIFFIN, of Maryville, in the county of Nodaway and State of Missouri, have invented a new and useful Improvement in Combined Listing and Subsoil Plow, of which the following is a specification:

Figure 1 is a vertical longitudinal section of my improved plow, taken through the line *x x*, Fig. 2. Fig. 2 is a top view of the same.

Similar letters of reference indicate corresponding parts.

In listing ground or preparing it for the drill it has heretofore been the practice to use two teams, one with a right-hand and the other a left-hand plow, to throw a furrow to each side, or to use a single team and plow, throwing a furrow to each side by passing across the land, and then passing back along the first furrow. The soil is then loosened in the wide furrow thus formed by passing along with a single horse and a small plow.

The invention will first be fully described, and then pointed out in the claims.

A represents the plow-beam, to which is attached the standard B, which is provided with a rearwardly-projecting brace-arm, *b'*, the end of which is also attached to the beam A to strengthen the said standard B against the draft-strain. To the lower end of the standard B is attached the foot C, to the inclined forward end of which is secured the double point D.

E is the double mold-board, which is secured to the standard B, the foot C, and the double point D by lugs or arms and bolts, as shown in Figs. 1 and 2. The double point D will, preferably, be made solid—*i. e.*, of one piece bent into the proper form to make the point or share of the plow. Both sides of the point D will be shaped precisely similar, so that one side will start a right-hand furrow and the other side a left-hand furrow. The double mold-board E is also preferably made solid or of one or two pieces, which, like the share or point, is to be bent into the proper form, and these two parts D and E will make a perfectly-formed right and left hand plow combined.

As thus constructed the plow will open a wide double furrow.

F is the subsoil-plow plate, which is secured to the foot of the standard G, which is curved upward and forward, and its forward end is bolted to the upper part of the standard B, several holes being formed in the said standard B to receive the said bolts, so that the pitch of the subsoil-plow may be readily adjusted as may be required. The standard G is held securely in position by the arms H, the lower ends of which are bolted to the opposite sides of the said standard G, and their upper ends are bolted to the handles I, several holes being formed in the upper ends of the said arms to receive the said bolts to enable the standard G to be adjusted as required. The lower ends of the handles I are attached to the upper rear parts of the double mold-board E. Their middle parts are attached to the ends of a round, J, that passes through and is secured to the rear end of the beam A, and their upper parts are connected by a round, K.

The subsoil plow or point F, like the pieces D and E of the large plow, will preferably be made of one solid piece, pressed into the required form by suitable machinery or forms, and the point so made will also make a perfectly-formed right and left hand plow.

Having thus described my invention, I claim as new and desire to secure by Letters Patent—

1. The combination of the subsoil-plow plate F, the adjustable curved standard G, and the adjustable braces H with the standard B, the foot C, the double point D, the double mold-board E, and the handles I, substantially as herein shown and described.

2. The double plow E D and the subsoil-plow F, combined and arranged together, as and for the purpose set forth.

IRA M. GRIFFIN.

Witnesses:

L. M. LANE,

S. R. BEECH.